United States Patent
Webster et al.

(10) Patent No.: US 7,131,532 B2
(45) Date of Patent: Nov. 7, 2006

(54) BELT ATTACHMENT DEVICE AND METHOD

(75) Inventors: Mark R. Webster, Colgate, WI (US); Craig S. Schmidt, Brown Deer, WI (US)

(73) Assignee: Pflow Industries, Inc., Milwaukee, WI (US)

( * ) Notice: Subject to any disclaimer, the term of this patent is extended or adjusted under 35 U.S.C. 154(b) by 0 days.

(21) Appl. No.: 11/135,915

(22) Filed: May 24, 2005

(65) Prior Publication Data

US 2005/0211532 A1    Sep. 29, 2005

Related U.S. Application Data

(63) Continuation of application No. 10/407,379, filed on Apr. 4, 2003, now Pat. No. 6,896,125.

(51) Int. Cl.
*B65G 29/00* (2006.01)

(52) U.S. Cl. ............... 198/867.15; 198/803.2

(58) Field of Classification Search ............ 198/803.2, 198/867.15, 867.14, 848
See application file for complete search history.

(56) References Cited

U.S. PATENT DOCUMENTS

| | | | |
|---|---|---|---|
| 660,027 A | 10/1900 | Proctor | |
| 3,870,141 A * | 3/1975 | Lapeyre et al. | 198/853 |
| 3,976,192 A * | 8/1976 | Muller | 198/835 |
| 3,985,224 A * | 10/1976 | Harvey | 198/851 |
| 4,344,209 A | 8/1982 | Harwood | |
| 4,553,663 A * | 11/1985 | Johnson | 198/731 |
| 4,653,632 A * | 3/1987 | Timmer et al. | 198/867.14 |
| 4,832,183 A | 5/1989 | Lapeyre | |
| 4,925,013 A | 5/1990 | Lapeyre | |
| 5,046,598 A | 9/1991 | Colamussi | |
| 5,467,867 A | 11/1995 | Musil et al. | |
| 5,529,168 A | 6/1996 | Soriano et al. | |
| 5,542,527 A | 8/1996 | Jakob | |
| 5,564,556 A | 10/1996 | Spada et al. | |
| 5,573,470 A | 11/1996 | Jakob | |
| 5,609,243 A | 3/1997 | Fujita et al. | |
| 5,669,114 A | 9/1997 | Jakob | |
| 5,695,043 A | 12/1997 | Maezuru et al. | |
| 5,738,223 A | 4/1998 | Rohrs | |
| 5,853,849 A | 12/1998 | Nishio et al. | |
| 6,053,308 A | 4/2000 | Vogrig et al. | |
| 6,070,714 A | 6/2000 | May | |
| 6,122,821 A | 9/2000 | Dornieden et al. | |
| 6,158,573 A | 12/2000 | Janzen | |
| 6,173,831 B1 * | 1/2001 | Grabscheid et al. | 198/844.1 |
| 6,209,716 B1 | 4/2001 | Bogle et al. | |
| 6,216,853 B1 | 4/2001 | Fujita | |
| 6,318,544 B1 | 11/2001 | O'Connor et al. | |
| 6,394,449 B1 | 5/2002 | Reist | |

(Continued)

*Primary Examiner*—Joe Dillon, Jr.
(74) *Attorney, Agent, or Firm*—Michael Best & Friedrich LLP

(57) ABSTRACT

A conveyor belt assembly including a flexible belt body with a plurality of spaced flexible teeth and at least one hardened tooth coupled to the belt body. The flexible belt body and flexible teeth comprise a resilient material. The hardened tooth comprises hardened plastic or metal. The flexible belt body also includes at least one reinforcing member within the belt body. A guide member is coupled to the flexible belt body and the hardened tooth to assist in transporting objects on the conveyor belt assembly. A pivotable clamping device clamps the ends of the belt body together to form a continuous belt. The clamping device clamps the reinforcing member to ensure a strong connection.

12 Claims, 6 Drawing Sheets

U.S. PATENT DOCUMENTS 6,425,478 B1  7/2002  Eberle 6,439,376 B1  8/2002  Spatafora et al.

* cited by examiner

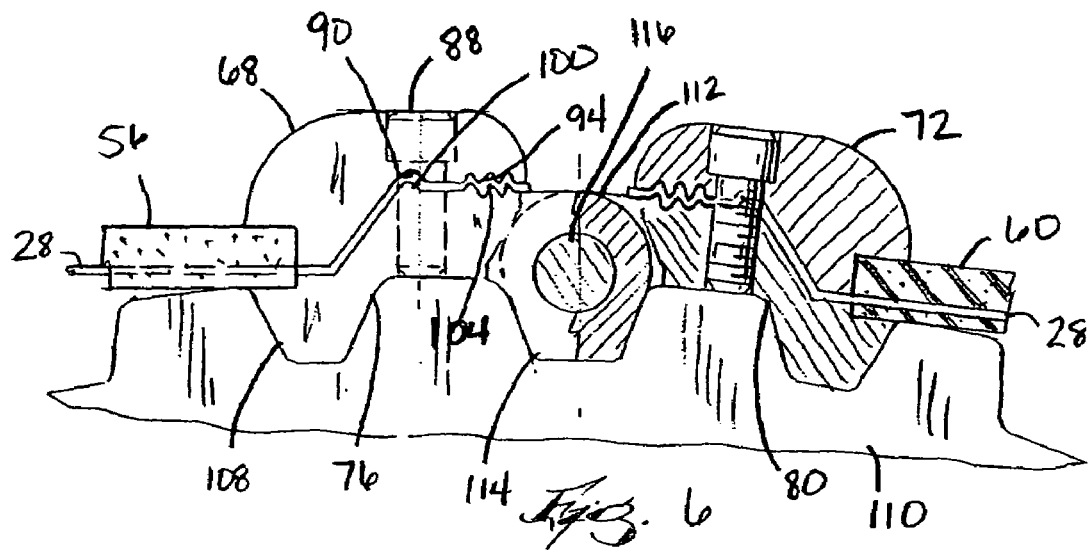
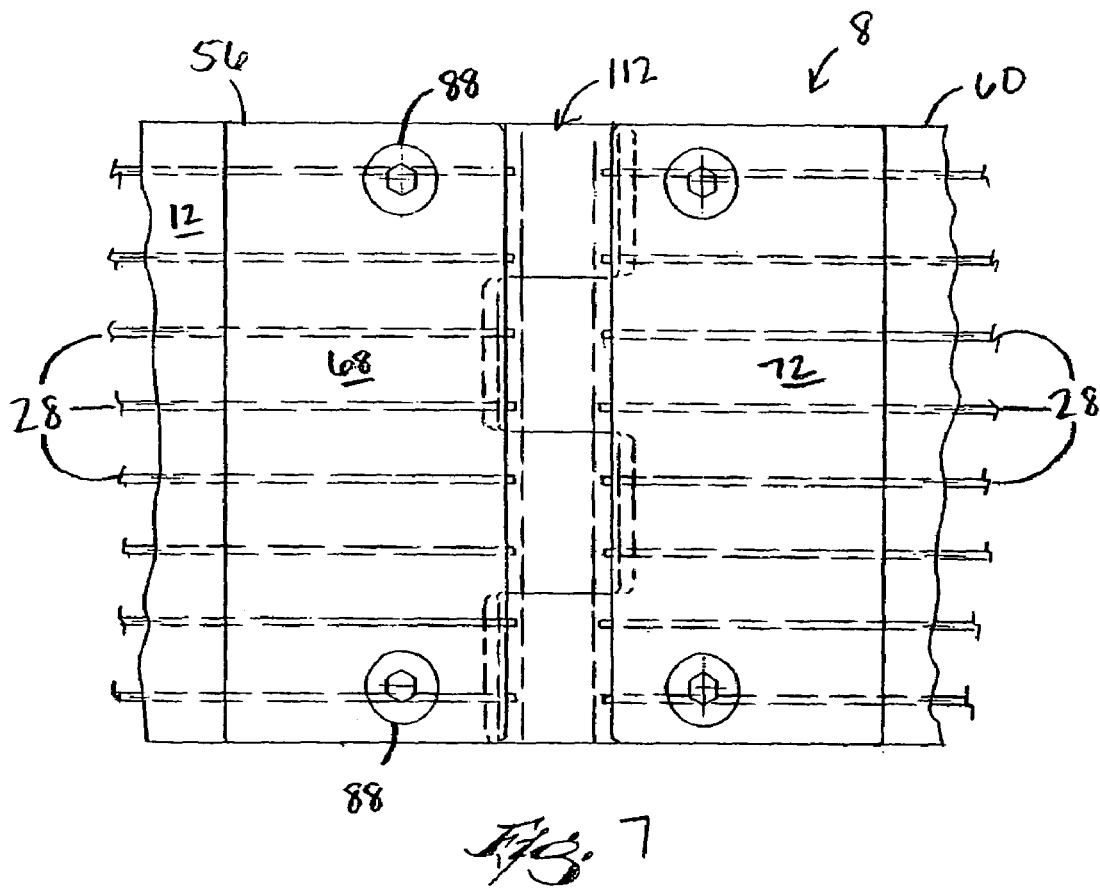

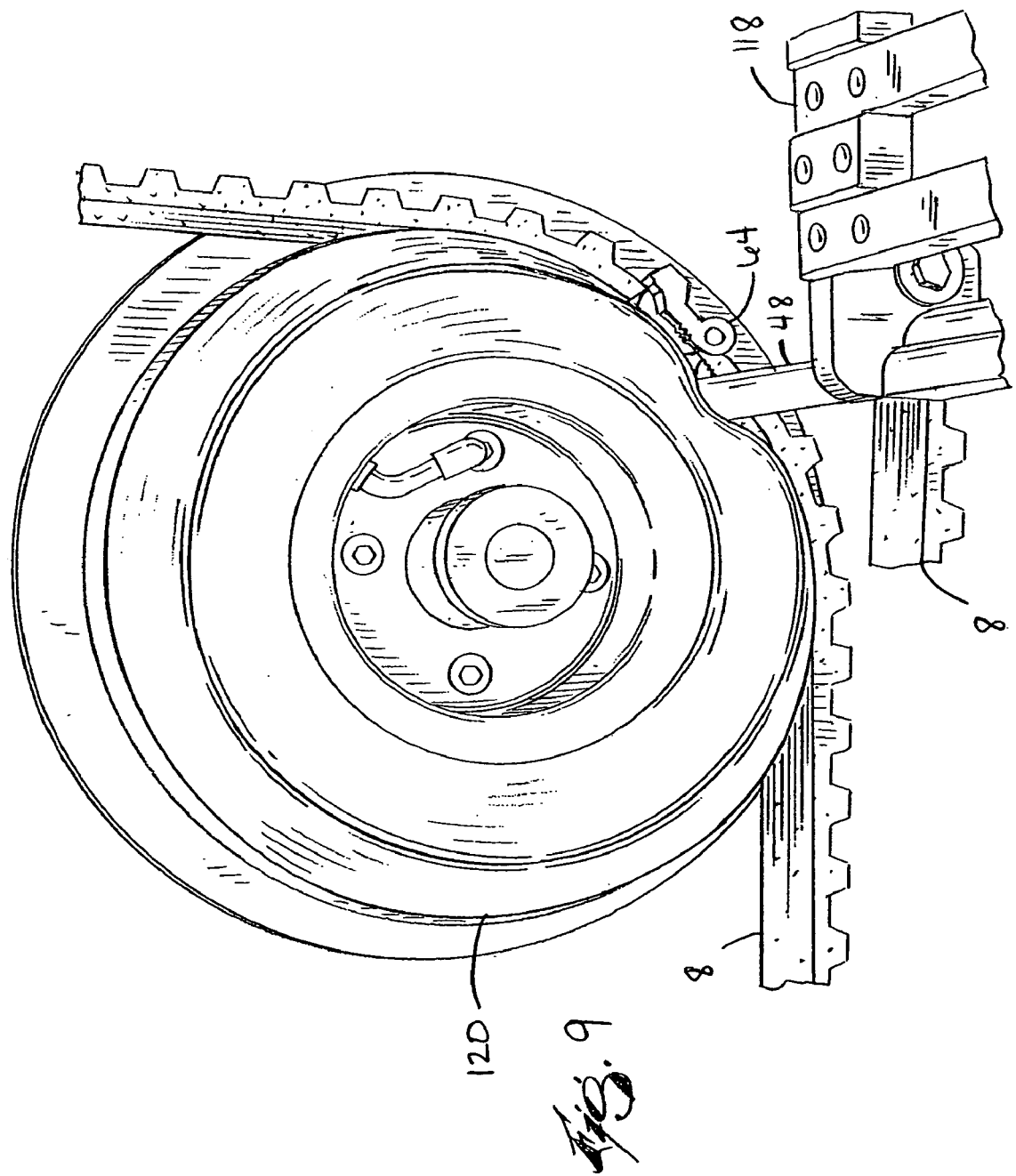

BELT ATTACHMENT DEVICE AND METHOD

CROSS-REFERENCE TO RELATED APPLICATIONS

This application is a continuation of U.S. application Ser. No. 10/407,379, filed Apr. 4, 2003, now U.S. Pat. No. 6,896,125, the entire contents of which is hereby incorporated by reference herein.

BACKGROUND

The invention relates to conveyor belts, and more particularly to methods of attaching objects to conveyor belts.

It is known in industries utilizing conveyor belt systems to mechanically attach items, such as baskets or bins, to conveyor belts to assist in moving objects from one point to another. The prevalent method of making attachments to conveyor belts is to glue or "weld" the attachments onto the belt. However, the bond created in this type of attachment often fails under heavy loads.

Another issue with conveyor belt systems is facilitating the removal and replacement of conveyor belts to replace worn or broken segments of the belt. In systems where an endless belt is used, an "endless" belt is commonly formed by splicing two ends of a belt together by serrating the edges and gluing the ends together. By gluing the ends together, it becomes difficult to remove and replace a conveyor belt. Often, the conveying machine must be disassembled to allow for removal and replacement of the belt.

SUMMARY

The present invention provides a conveyor belt assembly that facilitates mounting items to the belt. The assembly includes a flexible belt body with a first (outer) surface and a second (inner) surface. A plurality of flexible teeth (e.g. made of rubber) are positioned on the second surface for engagement with a toothed sprocket. At least one hardened tooth (e.g. hard plastic or metal) is also coupled to the second surface of the belt body to provide a location for attachment of an item to the belt.

In one embodiment, the hardened tooth has a cavity (e.g., a threaded hole) and the flexible belt body has a hole aligned with the cavity such that a fastener can be inserted through the hole and into the cavity to couple the hardened tooth to the belt body. The fastener can also be used to attach a guide member adjacent to the first surface of the belt body by inserting the fastener through the guide member, through the hole, and into the cavity in the hardened tooth.

The above-described conveyor belt assembly can be formed by a novel method. The method includes forming a belt having a body and a plurality of teeth of a flexible material, creating a space between two of the flexible teeth, and positioning a hardened tooth in the space. The method can further include positioning a guide member adjacent the belt body aligned with the tooth and attaching the guide member to the hardened tooth.

In another aspect, the invention provides a conveyor belt assembly having a high-strength coupling mechanism that facilitates attachment and detachment of the belt ends. The assembly includes a flexible belt body with first and second ends and a pivotable clamping device coupling the first and second ends into a continuous belt surface. In one embodiment, the assembly includes a plurality of flexible teeth mounted to the belt body and at least one reinforcing member (e.g., steel cables). The pivotable clamping device preferably includes a first clamp with first upper and lower portions and a second clamp with second upper and lower portions, the first and second clamps being pivotally coupled to each other. The first and second upper portions can include a recess that interacts with a raised area of the first and second lower portions to bend the reinforcing member around a tight radius to increase the clamping strength. An adhesive can also be applied to the first and second lower portions to further increase the clamping strength.

The above-described conveyor belt assembly can be formed by a novel method. The method includes forming a belt body out of flexible material and coupling a pivotable clamping device to the first and second ends of the belt body. Preferably, the reinforcing member is exposed at the first and second ends of the belt body. Adhesive can be applied to the pivotable clamping device to capture the reinforcing member, increasing the strength of the clamp. The reinforcing member can then be clamped by the pivotable clamping device, bending the reinforcing member around a tight radius to further increase the clamping strength of the pivotable clamping device.

Other features and advantages of the invention will become apparent to those skilled in the art upon review of the following detailed description, claims, and drawings.

BRIEF DESCRIPTION OF THE DRAWINGS

FIG. 6 is a side view of the clamping assembly shown in FIG. 5 engaged with a toothed pulley.

FIG. 7 is a top view of the clamping assembly shown in FIG. 5.

FIG. 9 is a perspective view of a resilient pulley system for use with the clamping assembly according to the present invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
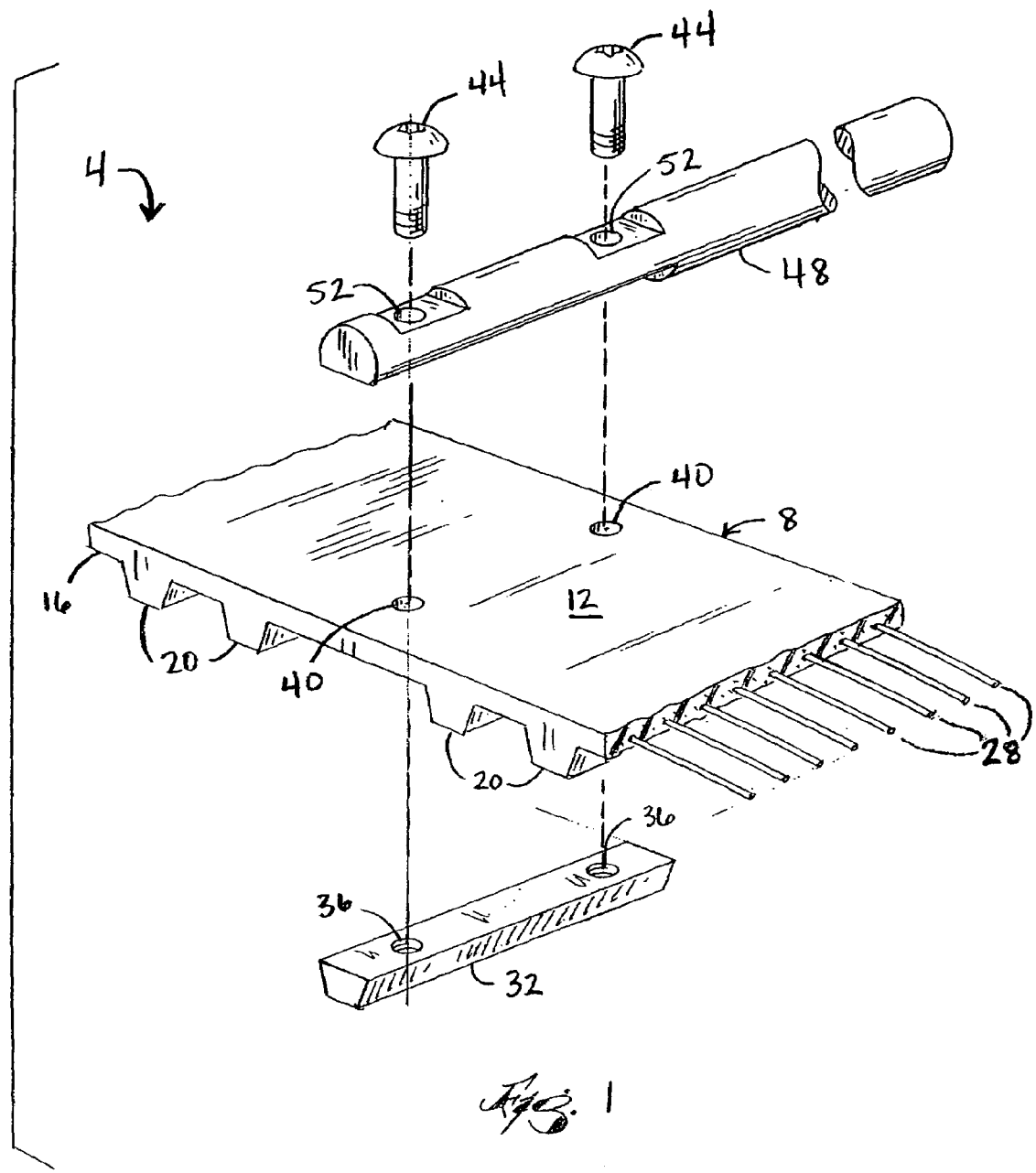
FIG. 1 is an exploded perspective view of a belt assembly according to one aspect of the present invention.
Figure 2:
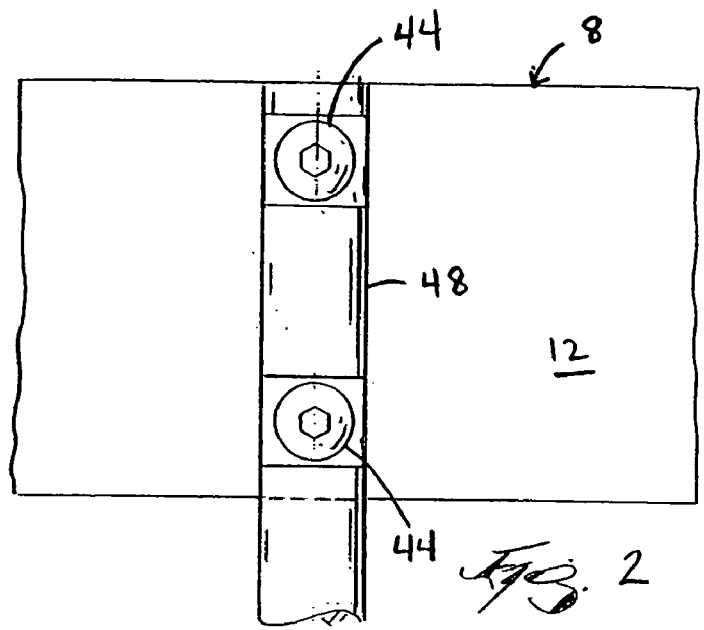
FIG. 2 is a top view of the belt assembly shown in FIG. 1.

FIG. 1 illustrates a portion of a conveyor belt assembly 4 according to one aspect of the present invention. The conveyor belt assembly 4 includes a flexible belt body 8 with a first surface 12 and second surface 16. It should be understood that the terms "first" and "second" are used for convenience to refer to the outer and inner surfaces of the belt. In the embodiment illustrated in FIGS. 1–4, the flexible belt body 8 is an endless belt. It is understood, however, that in other embodiments, such as the embodiment illustrated in FIGS. 5–7, the flexible belt body 8 may have discrete ends.

As shown in FIG. 1, the first surface 12 of the belt body 8 is a smooth, non-segmented surface. A plurality of flexible teeth 20 are formed with the belt body 8 on the second surface 16. The belt body 8 and teeth 20 are formed of a resilient material, such as rubber. It is understood by those skilled in the art that the belt body 8 and teeth 20 may be formed of any suitable flexible material, such as flexible plastic or other elastomeric material.

The illustrated belt body 8 also includes at least one reinforcing member. In the embodiment shown in FIG. 1, the reinforcing member is a plurality of steel cables 28. It is understood that the reinforcing member may instead comprise a steel belt, a plurality of Kevlar® strands, or any other suitable reinforcing material. It is also understood that the apparatus and method of the present invention could be utilized by a belt assembly 4 that does not include any reinforcing member.

Figure 3:
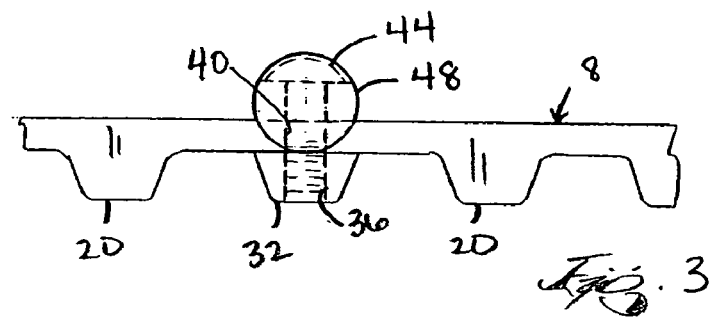
FIG. 3 is a side view of the belt assembly shown in FIG. 1.
Figure 4:
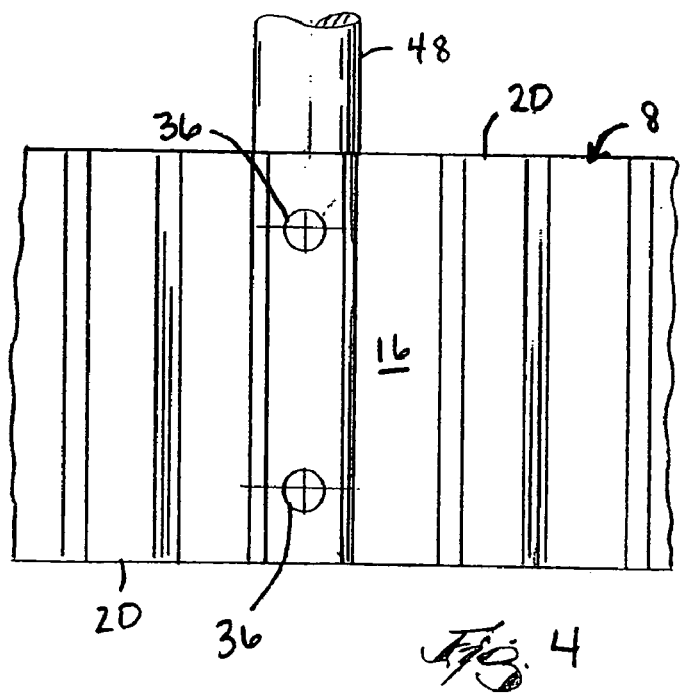
FIG. 4 is a bottom view of the belt assembly shown in FIG. 1.

As shown in FIGS. 1 and 3, one of the flexible teeth 20 is removed from the second surface 16 and replaced with a hardened tooth 32. The hardened tooth 32 may be made of hardened plastic, metal, any other suitable hardened material, or any combination of these materials. The hardened tooth 32 has a cavity to facilitate coupling the hardened tooth 32 to the belt body 8. In the embodiment of FIG. 1, the cavity is a threaded hole 36 extending through the entirety of the hardened tooth 32. But it should be understood that in other embodiments, the cavity might only extend partially into the hardened tooth 32. In addition, the threaded hole 36 could be formed by a threaded insert positioned in another material.

The belt body 8 includes two belt holes 40 to facilitate coupling the hardened tooth 32 to the belt body 8. The belt holes 40 are formed through the first and second surfaces 12, 16 and are aligned with the threaded hole 36 in the hardened tooth 32. Fasteners couple the hardened tooth 32 to the flexible belt body 8. In the illustrated embodiment, the fasteners are threaded bolts 44.

In the embodiment illustrated in FIGS. 1–4, the belt assembly 4 also includes a guide member 48 coupled to the first surface 12 of the belt body 8. The guide member 48 allows other objects, such as a basket, a bin, or a shelf (not shown), to be attached to the belt body 8 to assist in transporting goods with the assembly 4. The guide member 48 has two holes 52 aligned with the belt holes 40 in the belt body 8 and with the threaded holes 36 in the hardened tooth 32. As shown in FIG. 1, the guide member 48 is coupled to the belt body 8 by the bolts 44. By coupling the guide member 48 to a hardened tooth, a stronger mechanical connection is made allowing the conveyor belt assembly 4 to more effectively transport heavy loads.

It should be understood that in other embodiments (not shown) the guide member 48 could be coupled to the hardened tooth 32 without the use of the threaded bolts 44.

In these embodiments, there would be no belt hole 40, nor would there be a need for the hole 36 in the hardened tooth 32. Instead, the guide member 48 could be coupled to the hardened tooth 32 by a coupling member, such as a metal strap, around the side of the belt body 8. The coupling member would be attached at one end to the hardened tooth 32 and at the other end to the guide member 48. By attaching the guide member and hardened tooth in this manner, a belt of lesser thickness could be used to achieve the same belt strength because there would be no hole formed through the belt.

As noted above, FIG. 1 illustrates a portion of the conveyor belt assembly 4 of the present invention. The portion illustrated in FIG. 1 may be repeated in spaced increments across the length of the belt assembly 4 to allow for multiple guide members 48 to be attached to the flexible belt body 8. This would require removing one of the flexible teeth 20 at spaced increments and replacing the flexible tooth 20 with a hardened tooth 32.

The conveyor belt assembly 4 can be made by the following process. First, a belt body 8 and a plurality of teeth 20 are formed out of a flexible material. As shown in FIGS. 1–4, the belt body 8 is reinforced with a plurality of steel cables 28. A space 54 is created between two adjacent flexible teeth 20 to facilitate coupling an object to the belt body 8. The space 54 may be created by removing a flexible tooth 20 from the belt body 8 (as shown in FIGS. 1 and 3) or by forming the belt body 8 with a tooth missing. A belt hole 40 is formed in the belt body 8 aligned with the space 54. A hardened tooth 32 is aligned in the space 54 adjacent the belt body 8. A guide member 48 is then positioned adjacent the belt body 8 in opposing relation to the hardened tooth 32. A threaded hole 36 is formed in the hardened tooth 32 and a threaded bolt 44 is inserted through the guide member 48 and the belt hole 40 into the threaded hole 36 in the hardened tooth 32, thereby coupling the guide member to the hardened tooth 32.

Figure 5:
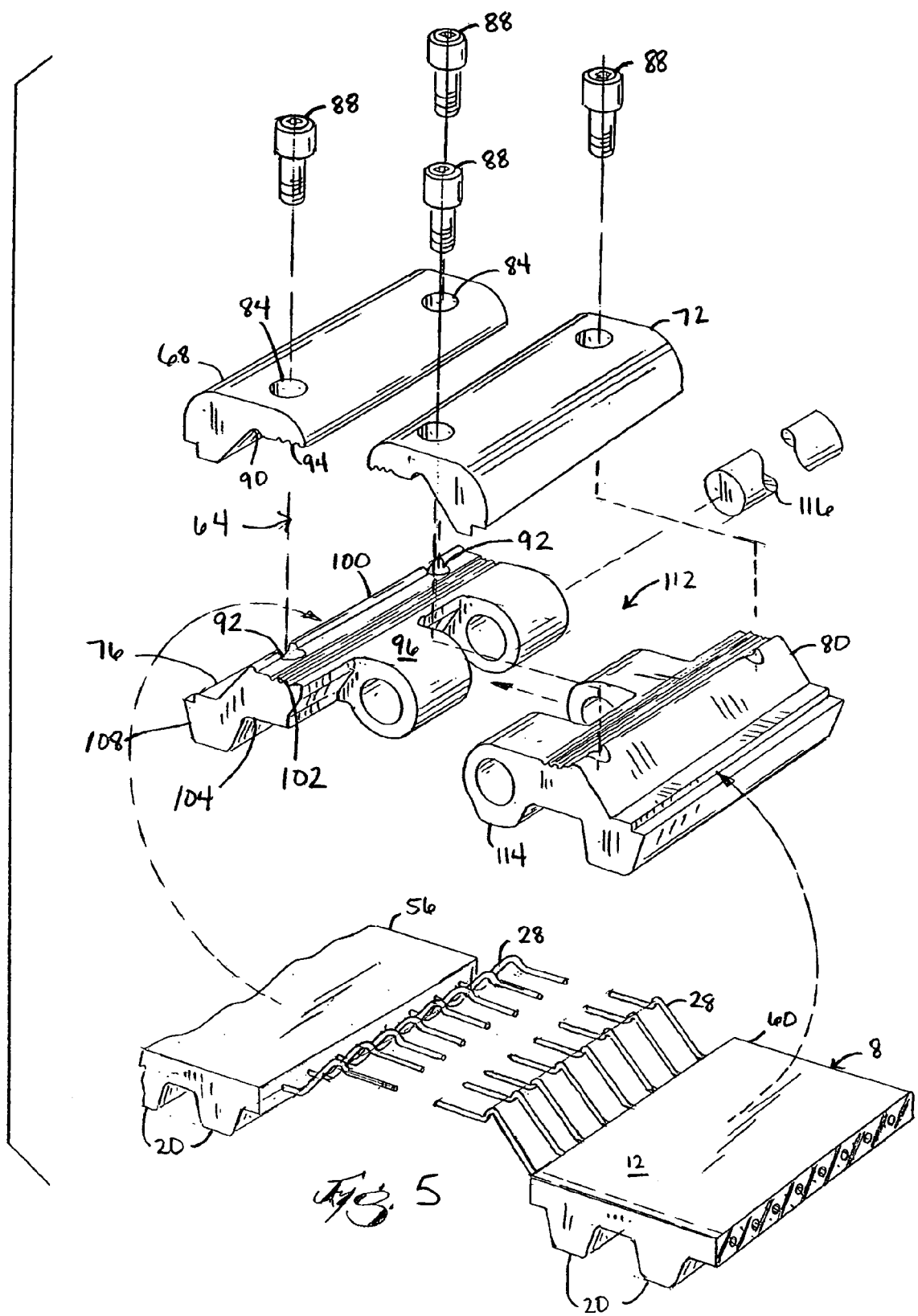
FIG. 5 is an exploded perspective view of a clamping assembly according to another aspect of the present invention.

FIG. 5 illustrates another assembly that embodies the second aspect of the present invention. The flexible belt body 8 includes a first end 56 and a second end 60. The conveyor belt assembly 4 further includes a pivotable clamping device 64 that couples the first and second ends 56, 60 of the belt body 8 to form the belt body 8 into a continuous loop. In other embodiments (not shown), the first end of one belt body portion may be connected to the second end of a second belt body portion, the first end of the second belt body portion connected to the second end of a third belt body portion (and so on) to create a continuous belt assembly of multiple belt body portions. This arrangement provides both continuity in the belt and ease of removal of any given belt portion should that portion need repair.

The pivotable clamping device 64 includes a first clamp having a first upper portion 68 and a first lower portion 76, and a second clamp having a second upper portion 72 and a second lower portion 80. The first upper portion 68 and the first lower portion 76 are coupled to the first end 56 of the belt body 8, and the second upper portion 72 and the second lower portion 80 are coupled to the second end 60 of the belt body 8.

The first and second upper portions 68, 72 are identical with respect to each other, and the first and second lower portions 76, 80 are substantially identical, with the exceptions noted below. Therefore, only the first upper portion 68 and first lower portion 76 will be described in detail. The first upper portion 68 includes two openings 84 that allow the insertion of a fastener in the form of a bolt 88 to couple the first upper portion 68 to the first lower portion. The first upper portion 68 also includes a recessed area 90 that cooperates with the first lower portion 76 to increase the clamping strength of the clamping device 64. The first upper portion 68 also includes a plurality of ridges 94 that cooperate with the first lower portion 76, as will be described in detail below.

The first lower portion 76 includes two cavities in the form of threaded holes 92 that are aligned with the openings 84 in the first upper portion 68. The first lower portion 76 includes a first surface 96 including a raised area 100 that fits with the recessed area 90 of the first upper portion 68 to increase the clamping strength of the clamping device 64. The first surface 96 further includes a plurality of ridges 102 that cooperate with the ridges 94 of the first upper portion 68, also increasing the clamping strength of the clamping device 64.

As illustrated in FIGS. 5–7, the first lower portion 76 includes a second surface 104 that includes a generally tooth-shaped protrusion 108. The generally tooth-shaped protrusion 108 facilitates the travel of the portion of the belt assembly 4 that includes the clamping device 64 around a tooth-receiving portion or pulley 110 of a conveyor. Referring to FIGS. 5 and 6, as the belt body 8 travels around the pulley 110, it is the first flexible tooth 20 that is immediately adjacent each of the ends 56, 60 of the belt body 8 that supports the belt body 8 and maintains the proper position of the belt body 8 as the belt body 8 travels around the pulley 110. The elastic behavior of the teeth 20 allows the load to be distributed to a number of elastic teeth 20. The tooth-shaped protrusion 108 mimics the tooth-shape but is undersized so as not to interfere with the elastic behavior of the teeth 20. Those skilled in the art will also understand that the tooth-shaped protrusion 108 is not necessary at all for the belt assembly 4 to travel around the pulley 110.

The illustrated clamping device 64 also includes a central hinge member 112, shown in FIG. 5 being integrally formed with the lower portions 76, 80 of the clamping device 64. The central hinge member 112 allows the clamping member 64 to flex or pivot as it travels over any rounded portion of the path of travel of the conveyor belt assembly 4. As illustrated in FIGS. 5 and 6, the central hinge member 112 of the second lower portion 80 has a generally tooth-shaped portion 114 that extends into the pulley 110 of the conveyor to further facilitate the travel of the clamping device 64 around the pulley 110. Again, this tooth-shaped portion 114 is undersized compared to the elastic teeth 20 so that the tooth-shaped portion 114 will not interfere with the operation of the elastic teeth 20. Those skilled in the art will understand that the tooth-shaped portion 114 is not necessary for the belt assembly 4 to travel around the pulley 110. A pin or fastener 116 is inserted through the central hinge member 112 to couple the lower portions 76, 80 of the clamping device 64 together, thereby coupling the first and second ends 56, 60 of the belt body 8 into a continuous loop.

As shown in FIG. 5, to ensure that the clamping device 64 is coupled to the belt body 8 with sufficient strength, a portion of the belt body material is removed from the ends 56, 60 to expose the steel cables 28 within the flexible belt body 8. The steel cables 28 are inserted between the upper and lower portions 68, 76 of the clamp such that the clamping device 64 is coupled directly to the steel cables 28. An adhesive, such as a high-strength epoxy adhesive, may be applied to the lower portion 76 of the clamping device 64 to capture the cables and increase the strength of the clamp. The engagement of the raised area 100 and the recessed area 90 acts to bend the steel cables 28 around the tight radius of the raised area 100. The radius of the raised area 100 is less than about 0.25 in., preferably less than about 0.15 in., and in the illustrated embodiment the radius measures about 0.094 in. The radius of the recessed area 90 is less than about 0.3 in., preferably less than about 0.25 in., and in the illustrated embodiment the radius measures about 0.125 in. This bending facilitates a better engagement of the clamping device 64 with the steel cables 28 to increase the strength of the coupling.

The ridges 94, 102 of the first upper portion 68 and first lower portion 76 also clamp together, bending the steel cables 28 along the ridges 94, 102, thereby further increasing the clamping strength of the clamping device 64. The engagement of the aforementioned ridges 94, 102 with the addition of the adhesive increases the clamping strength of the clamping device 64 in that in order to release the belt ends 56, 60 from the clamping device 64 unintentionally, not only must the steel cables 28 be stripped out from between the upper and lower portions of the clamping device 64, but the adhesive must also shear to release the cables 28.

As shown in FIG. 6, the bolts 88 are inserted through the upper portions 68, 72 at the point of the recessed area 90, further adding to the strength of the coupling by putting the greatest clamping pressure on the point where the steel cables 28 are bent by the engagement of the recessed area 90 and the raised area 100. The bolts 88 are inserted through the openings 84 of the upper portions 68, 72 and received in the threaded holes 92 to clamp the ends 56, 60 of the belt body 8 together.

Using the above structure, the first and second ends 56, 60 of the belt body 8 can be attached according to the following process. A portion of the flexible material of the belt body 8 is removed at the first and second ends 56, 60 to expose the steel cables 28. An adhesive is applied to the inner surfaces of the clamping device 64. The first and second ends 56, 60 of the belt body 8 are inserted into the respective clamps, and the cables 28 are fed between the respective raised portions 100 and recessed portions 90 and are captured by the adhesive. The bolts 88 are then inserted and tightened to clamp the clamping device 64 to the belt body 8. The clamping device 64 is thus coupled directly to the steel cables 28.

Figure 8:
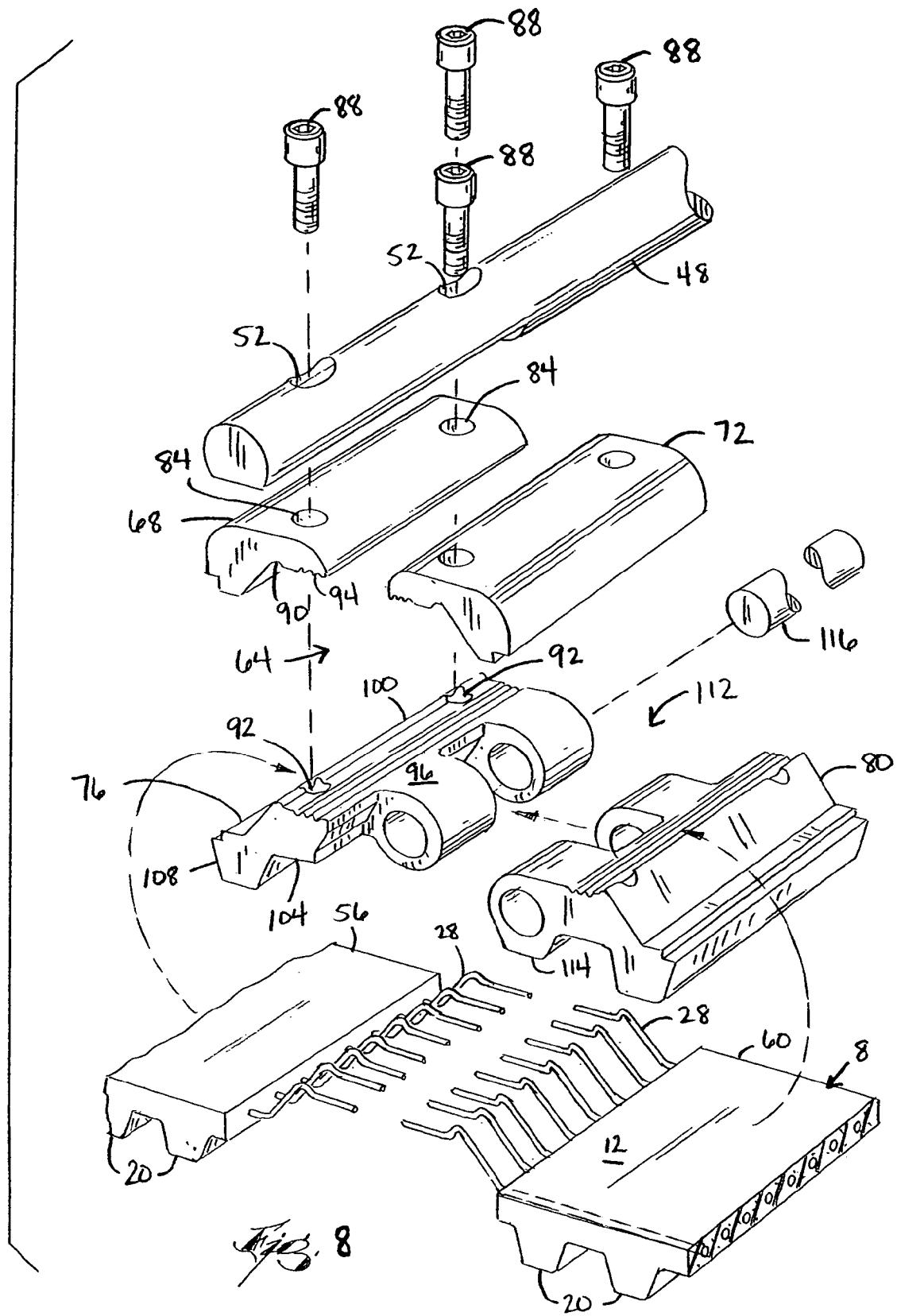
FIG. 8 is an exploded perspective view of a clamping assembly according to another aspect of the present invention.

It should be understood that the embodiment illustrated in FIGS. 5–7 may be used in combination with other embodiments, such as the embodiment illustrated in FIGS. 1–4, or it may be used alone. Similarly, the embodiment illustrated in FIGS. 1–4 may be used alone or in combination with other embodiments. For example, as shown in FIG. 8, the guide member 48 could be secured directly to the clamping device 64, obviating the need for attaching a hardened tooth 32 to the belt body 8. In this embodiment, the holes 52 in the guide member 48 are aligned with the openings 84 in the first upper portion 68 of the clamping device 64. By so doing, the bolts 88 are used to both secure the guide member 48 to the clamping device 64 and to clamp the first upper and lower portions 68, 76 together, securing the steel cables 28 of the belt body 8 between them.

With reference to FIG. 9, it is also understood by those of skill in the art that the above described method of connecting or attaching belts, such as the clamping device 64, will form a bump that passes over the pulley during the reverse bending of the belt in certain systems. Reverse bending of the belt occurs, for example, when the belt according to the present invention is used in a lift mechanism. In such a mechanism, the guide member 48 is used to support a lift platform 118. The path of the belt through the lift mechanism commonly results in reverse bending of the belt, as illustrated in FIG. 9. One solution (not shown) is to form pockets in the rigid pulley that would provide clearance for the clamping device 64 during the reverse bending of the belt. This can be complicated due to the timing required to position the clamping assembly 64 within the clearance in the rigid pulley.

Another solution, illustrated in FIG. 9, is to utilize a resilient pulley in the conveyor system to allow the clamping device 64 to pass during reverse bending of the belt. In the illustrated embodiment, the resilient pulley is a pneumatic tire 120. As the clamping device 64 passes over the tire 120 during reverse bending of the belt, the tire 120 deflects, allowing the clamping device 64 to pass over the tire 120 without damaging the clamping device 64 or disrupting the motion of the belt. A resilient pulley, such as the tire 120, also provides for shock absorption in the event that a load crashes, minimizing the potential for damage to the equipment. The tire 120 also provides more time for the electronic sensors (not shown) in the equipment to detect an overload condition due to a load crash and to shut down the drive system in response. The pneumatic tire 120 also automatically compensates for any stretching or wear of the belt or the steel cables 28 within the belt body 8 caused by use or by settling of the wires in the steel cables 28. Prior systems utilizing rigid pulleys and chain-driven belts require periodic adjustments for chain wear. The tire 120 performs these types of adjustments automatically.

The embodiments described above and illustrated in the drawings are presented by way of example only and are not intended as a limitation upon the concepts and principles of the present invention. As such, one having ordinary skill in the art will appreciate that various changes in the elements and their configuration and arrangement are possible without departing from the spirit and scope of the present invention as set forth in the following claims.

What is claimed is:

1. A conveyor belt assembly comprising:
   a flexible belt body having a first surface and a second surface;
   a plurality of spaced flexible teeth positioned on the second surface of the flexible belt body;
   at least one hardened tooth coupled to the second surface of the flexible belt body; and
   a guide member to assist in transferring goods disposed on the first surface of the flexible belt body and coupled to the at least one hardened tooth.

2. The conveyor belt assembly of claim 1, wherein the hardened tooth has a cavity.

3. The conveyor belt assembly of claim 2, further comprising a hole in the flexible belt body aligned with the cavity in the hardened tooth such that a fastener can be inserted through the hole into the cavity to couple the hardened tooth to the flexible belt body.

4. The conveyor belt assembly of claim 3, wherein the guide member includes a hole aligned with the hole in the flexible belt body and the cavity in the hardened tooth such that a fastener can be inserted through the holes and the cavity to couple the guide member to the hardened tooth.

5. The conveyor belt assembly of claim 2, wherein the cavity within the hardened tooth is a hole extending through the entirety of the hardened tooth.

6. The conveyor belt assembly of claim 5, wherein the hole is threaded.

7. The conveyor belt assembly of claim 1, wherein the flexible belt body and the flexible teeth comprise the same material.

8. The conveyor belt assembly of claim 7, wherein the flexible belt body and the flexible teeth comprise a resilient material.

9. The conveyor belt assembly of claim 1, wherein the hardened tooth comprises plastic.

10. The conveyor belt assembly of claim 1, wherein the hardened tooth comprises metal.

11. The conveyor belt assembly of claim 1, wherein the flexible belt body is an endless belt body.

12. The conveyor belt assembly of claim 1, further comprising at least one reinforcing member within the flexible belt body.

* * * * *